No. 755,142. PATENTED MAR. 22, 1904.
S. LAKE.
STORAGE BATTERY CONSTRUCTION.
APPLICATION FILED DEC. 17, 1903.
NO MODEL.

Witnesses
Frank S. Ober
H. A. Konnemann.

Inventor
Simon Lake,
By his Attorney
Henry C. Miller.

No. 755,142. Patented March 22, 1904.

UNITED STATES PATENT OFFICE.

SIMON LAKE, OF BRIDGEPORT, CONNECTICUT.

STORAGE-BATTERY CONSTRUCTION.

SPECIFICATION forming part of Letters Patent No. 755,142, dated March 22, 1904.

Application filed December 17, 1903. Serial No. 185,465. (No model.)

*To all whom it may concern:*

Be it known that I, SIMON LAKE, a citizen of the United States, residing at Bridgeport, in the county of Fairfield and State of Connecticut, have invented certain new and useful Improvements in Storage-Battery Constructions, of which the following is a specification, reference being had therein to the accompanying drawings.

This invention relates to an improvement in that class of storage batteries in which each cell contains two series of plates, the members of each of which are connected together by a common bus-bar; and its object is to form this connection between the plates of such character that individual plates may readily be removed without disturbing the others or the common connection of those adjacent the one removed.

To this end the invention consists in the devices herein shown and described.

Figure 1:
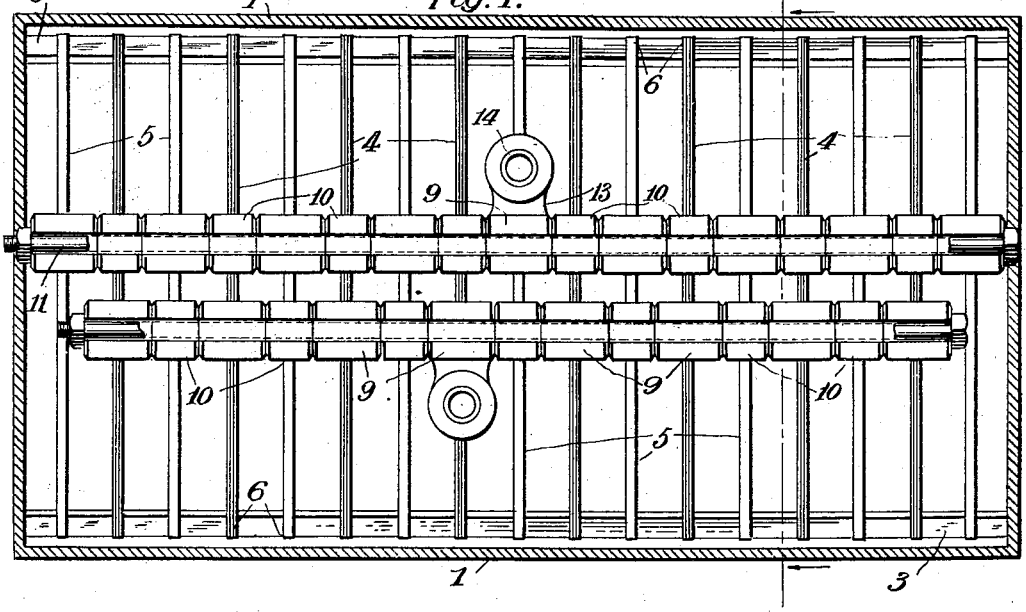
Figure 2:
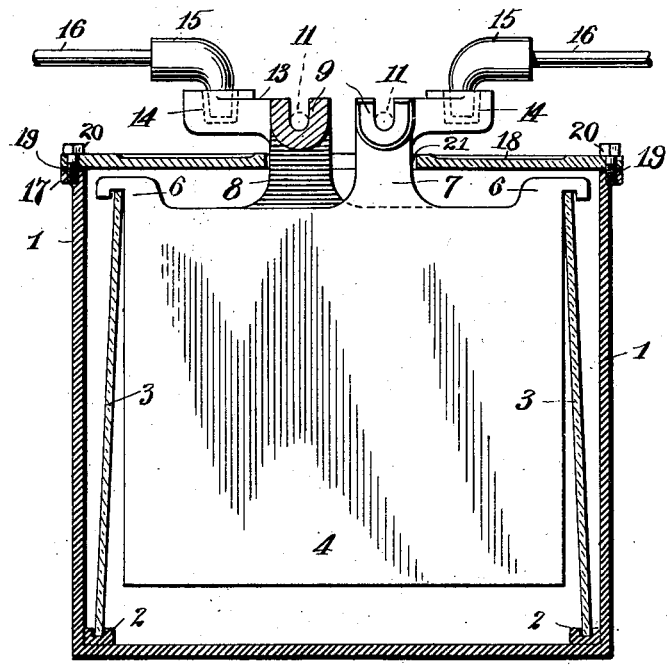
Figure 3:
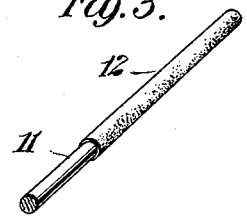

In the drawings annexed, Figure 1 is a transverse section, and Fig. 2 a plan, of a storage battery embodying my present improvement, the cover being omitted in Fig. 2. Fig. 3 is a detail view of the lead-covered bolt 11 12.

The cell comprises a jar or casing 1, having disposed along the opposite edges of the bottom the grooved holding-strips 2, the grooves of which receive the lower edges of the glass supporting-plates 3, upon whose upper edges are hung the independent series of positive plates 4 and negative plates 5, each having hooked lugs 6, disposed at the upper ends of the opposite edges, the bodies of the plates being separated by the usual non-conducting rods or plates. Each of the alternately-arranged positive and negative plates is provided at its upper edge intermediate the hooked lugs with a central lug for its electrical connection with the adjacent plates or those of the same polarity, the connection-lugs 7 of the positive plates 4 being disposed upon one side of the center line of the cell and the connection-lugs 8 of the negative plates 5 being disposed upon the opposite side, as usual. As shown herein, each of the connection-lugs is provided with transverse hubs or projections 9, serving as bearings for the adjacent faces of distance-pieces 10, of similar form, interposed between the adjacent projections of the connection-lugs of the plates of like polarity, and with them forming a sectional bus-bar providing an electrical connection between the plates of each series. The component sections of the bus-bar thus formed are all grooved in the upper side longitudinally thereof to receive a tie rod or bolt 11, which when provided with a lead coating 12 may suffice to permanently maintain the several sections of the bus-bar in proper electrical contact, but which may be used only in assembling the parts when the opposed faces of the bus-bar sections, suitably prepared, are united in a suitable fused joint by soldering or other well-known means to form an electrically perfect connection between the adjacent members, after which the said tie-rod may be withdrawn. The peripheries of the hubs 9 and distance-pieces 10 are preferably chamfered to form a groove or notch between such members for more easily separating them when required.

One of each of the connection-lugs 7 and 8 or its hub 9 is shown provided with a laterally-extending connection-piece 13, having a socket 14, entered by the smaller end of an elbow union-piece 15, whose opposite end is similarly socketed to receive the end of the flexible cable 16, forming the line conductor or the connection between the elements of each battery-cell and those of the adjacent cell. The cell is shown provided with a cover-plate 18, secured to the marginal flange 17 of the jar 1 upon the interposed packing 19 by bolts 20 or by other suitable means, an aperture 21 being formed in said plate, through which the connection-lugs 7 and 8 may project.

In the use of the device as above described, in case of the buckling of a single plate or its excessive deterioration from any cause, such plate may be readily removed by merely severing the bus-bar by a suitable shearing-tool upon opposite sides of such plate at the joints of the connection-lug bosses with the adjacent distance-pieces and similarly removing the corresponding distance-piece of the other sectional bus-bar of opposite polarity, which distance-piece is disposed directly above the plate to be removed, when the latter may be withdrawn without in any wise disturbing the remaining plates of the cell. When the necessary repair has been effected, the plate is returned to its initial position, with its integral section of the bus-bar intermediate the adjacent sections, when the application of pressure and heat will serve to reunite the parts in a fused joint. The removed distance-piece forming a section of the other bus-bar may be similarly reinserted. The application of the necessary heat for the operation above described is readily effected by means of a suitably-designed electrical heating appliance for embracing the portion of the bus-bar to be operated upon or by any other description of heating appliance capable of heating the parts to be united, the sections being drawn together by the use of the tie-rod, before described. Thus a large amount of time and labor is saved as compared with the use of prior constructions wherein each element of the cell of the same polarity was secured to a continuous bus-bar, necessitating the breaking of all joints and the removal of both bus-bars before even a single plate could be withdrawn.

By the present improvement the building up of a number of sections into a bus-bar and uniting them mechanically by means of a tie rod or bolt or by an electrically perfect joint by fusion, as before described, enables the sections to be detached to maintain the initial character of their contact-faces for subsequent connection, and the scoring of the joints by the formation of notches for locating with certainty the edge of the shearing-tool, in the case of fused joints, insures the parting of such joints intermediate the faces of the component sections, so as to maintain such faces in condition to be easily reunited when the repairs have been effected.

I have not claimed herein the process of forming the bus-bars of a series of independent sections, including portions of the battery-plates electrically connected together by fused joints and of subsequently removing individual plates with their bus-bar sections and thereafter reinserting the latter and reuniting them by fusion to the adjacent sections by application of heat, as I propose to file a separate application for such improvement.

From the foregoing description it will be understood that the present improvement is not limited to the particular construction and arrangement of parts herein shown and described, but may be materially varied without departure from the spirit of the present invention, the essential feature of which is the combination, with the battery-plates, of bus-bars built up of series of separable sections with which the respective plates are permanently connected.

Having thus set forth the nature of the invention, what I claim herein is—

1. A storage-battery cell comprising series of plates of opposite polarity, and sectional bus-bars built up of component members permanently connected with the plates of like polarity with interposed distance-pieces.

2. A storage-battery cell comprising series of plates of opposite polarity each provided with transverse bosses, and distance-pieces interposed between said bosses upon adjacent plates of like polarity to form with the same composite bus-bars connecting the plates of each series.

3. A storage-cell comprising series of plates of opposite polarity having the surfaces of their upper portions prepared for union with contiguous members similarly prepared, and interposed distance-pieces with their adjacent faces similarly prepared and united therewith in electrically perfect joints by application of heat, as in soldering, or the like, combined with means for mechanically securing said parts together in a sectional bus-bar.

In testimony whereof I have signed my name to this specification in the presence of two subscribing witnesses.

SIMON LAKE.

Witnesses:
 WILLIAM WILLIAMS,
 CHAS. H. KOEHNE, Jr.